United States Patent [19]
McCann

[11] Patent Number: 6,002,233
[45] Date of Patent: Dec. 14, 1999

[54] LOW TORQUE RIPPLE SWITCHED RELUCTANCE MOTOR REGULATION SYSTEM

[75] Inventor: Roy A. McCann, Kettering, Ohio

[73] Assignee: ITT Manufacturing Enterprises, Inc., Wilmington, Del.

[21] Appl. No.: 08/994,813

[22] Filed: Dec. 19, 1997

[51] Int. Cl.[6] .............................. H02P 7/40; H02K 11/00; H02K 29/08
[52] U.S. Cl. .......................... 318/701; 318/138; 318/700; 310/156
[58] Field of Search ........................... 318/138, 245–269, 318/700–769; 310/156

[56] References Cited

U.S. PATENT DOCUMENTS

| | | | |
|---|---|---|---|
| 4,218,646 | 8/1980 | Akamatsu | 318/800 |
| 4,670,696 | 6/1987 | Byrne et al. | 318/701 |
| 4,751,415 | 6/1988 | Kitamori et al. | 310/156 |
| 4,883,999 | 11/1989 | Hendershot | 310/254 |
| 5,111,095 | 5/1992 | Hendershot | 310/168 |
| 5,422,525 | 6/1995 | Mansir | 310/179 |
| 5,461,295 | 10/1995 | Horst | 318/701 |

*Primary Examiner*—Paul Ip
*Attorney, Agent, or Firm*—Margaret A. Dobrowitsky

[57] ABSTRACT

An system for minimizing the output torque ripple effect in a switched reluctance electric motor operating in phase overlap mode positions at least one compensating coil such that, when energized, the magnetic flux of the field created by current flowing through the compensation coil couples and opposes the magnetic flux created in the main winding of compensation coil.

14 Claims, 4 Drawing Sheets

LOW TORQUE RIPPLE SWITCHED RELUCTANCE MOTOR REGULATION SYSTEM

FIELD OF THE INVENTION

The invention relates to a system for minimizing the torque ripple effect in a Switched Reluctance Motor (SRM) operating in phase overlap mode through the use of strategically mounted coils to compensate for the variation in the magnetic flux field and the associated variation in the output torque that occurs during the switching intervals of phase overlap operation.

BACKGROUND OF THE INVENTION

The torque spikes created during the switching intervals of phase overlap operation in a SRM are generally referred to as "torque ripples." Torque ripples arise as a result of the increase in magnetic flux field that occurs when two of the sequential phases of the SRM are energized at the same time. Currently, torque ripple effect is minimized using expensive current shaping circuits. A low cost technique is needed for passively minimizing torque ripple effect in SRMs.

SUMMARY OF THE INVENTION

An system for minimizing the output torque ripple effect in a switched reluctance electric motor operating in phase overlap mode positions at least one compensating coil such that, when energized, the magnetic flux of the field created by current flowing through the compensation coil couples and opposes the magnetic flux created in the main winding of compensation coil.

DETAILED DESCRIPTION OF THE PREFERRED EMBODIMENT

Figure 1:
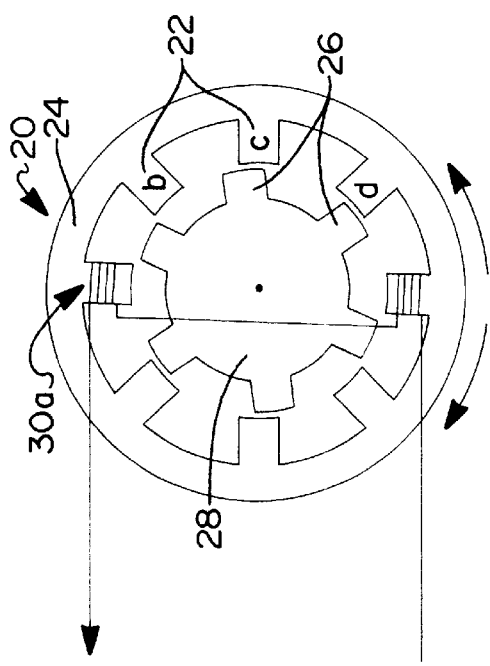
FIG. 1 is a cross-sectional view of a switched reluctance motor showing its multiple phases.

Referring now to the drawings in which each numeral represents the same component among the several views, FIG. 1 depicts a cross-sectional view of a four phase SRM 20 with eight stator poles 22 con its stator 24 and six rotor poles 26 on its rotor 28. Each pair of diametrically opposite stator poles 22 is connected by a winding that forms one of the motor's four "phases" 30a through 30d. The magnetic field resulting from the current flow through an energized phase 30a through 30d magnetically attracts the nearest neighboring rotor pole 26 causing the rotor 28 to rotate. The motor's output torque is sustained by sequentially switching current on and off through the series of phases 30a through 30d.

Figure 2:
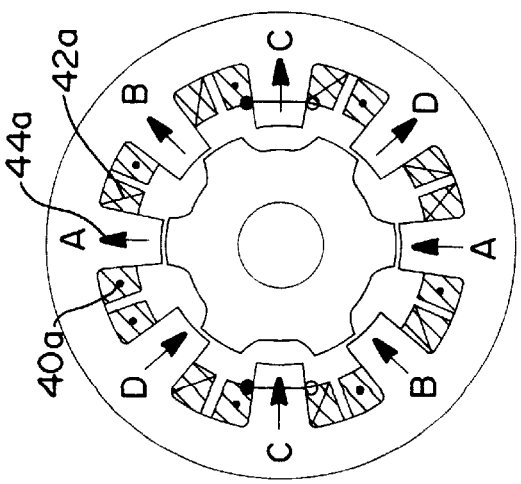
FIG. 2 is a cross-sectional view of a switched reluctance motor showing the direction of current flow through each of its multiple phase windings and the direction of the resulting magnetic flux field associated with each winding.

In FIG. 2, each of the dots 40 represents current that is flowing through the phase winding 30 in a direction that is perpendicular to and out of the plane of the paper. Each of the lines 42 represents current that is flowing through the phase winding 30 in a direction that is perpendicular to and into the plane of the paper. Each of the arrows 44 represents the direction of the magnetic flux field that results from the current flowing through the associated phase 30 in the direction indicated by the dot 40 and the line 42.

Figure 5:
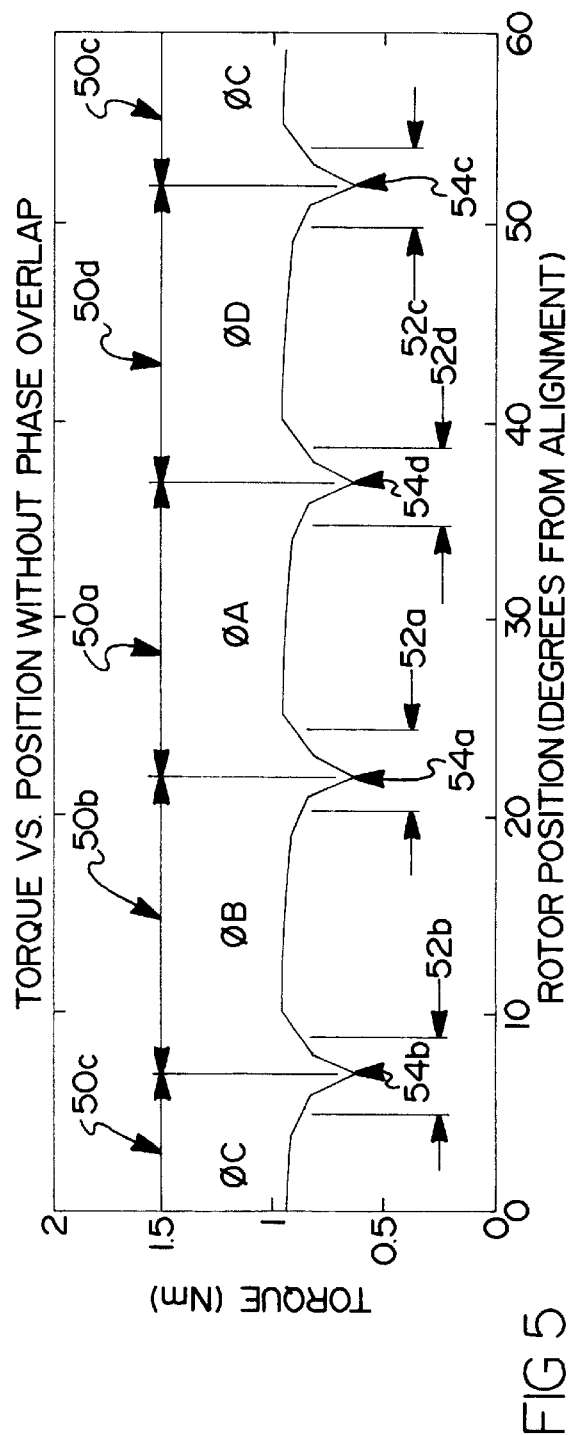
FIG. 5 is a graphical representation of the torque delivered by the motor's shaft shown as a function of the rotor's position in a motor having no overlap between the sequential periods during which each phase operates.

The torque delivered by a SRM operating with no overlap between the periods that each phase is energized is represented graphically in FIG. 5 as a function of the rotor position. The energized or conduction periods 50a through 50d of each phase φA through φD, respectively, repeat sequentially and continuously during motor operation. Switching intervals 52a through 52d are periods during which one phase 30 is de-energized and the next phase 30 in the sequence is energized. FIG. 5 shows that if operated with only one of its multiple phases 30 energized at a time, a SRM 20 delivers a reduced amount of torque 54a through 54d during each of the four switching intervals 52a through 52d.

Figure 6:
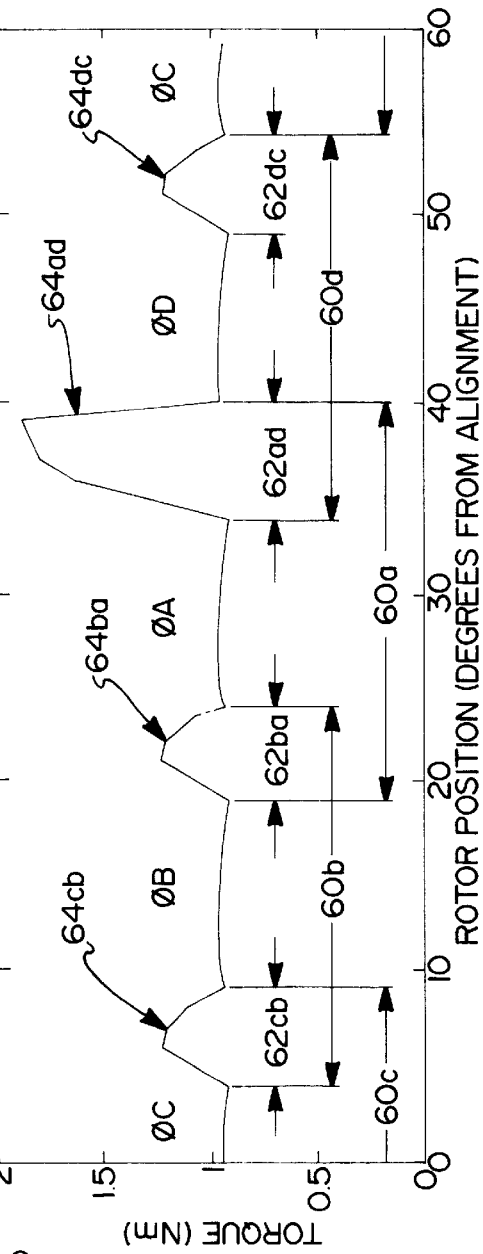
FIG. 6 is a graphical representation of a motor's output torque as a function of its rotor position for a motor with phase overlap that does not compensate for flux variation.

The reduced torque effect shown in FIG. 5 can be avoided by operating the SRM with "phase overlap." FIG. 6 is a graphical representation of the output torque delivered by a SRM 20 as a function of the position of its rotor 28 for a SRM 20 operating with a phase overlap conduction interval 62. In phase overlap operation, the energized or conduction periods 60a through 60d of each of the phases φA through φD, respectively, begins before the end of the preceding phase in the sequence. Although phase overlap operation eliminates the local decreases 54a through 54d in output torque that occur during unregulated operation, torque spikes 64 are created during the phase-overlap conduction intervals 62, as shown in FIG. 6.

The torque spikes 64a through 64d shown in FIG. 6 arise during the phase-overlap conduction intervals 62 because the flux created by increasing current flowing through the windings of the newly energized phase, phase 60a for example, constructively interferes or joins with the flux created by the current still flowing through the preceding energized phase, phase 60b in the example. The flux from the preceding phase 60b then falls off after the current through that phase 60b is switched off. Higher torque output represented by the torque spike 64d created during the phase-overlap conduction interval 62 between the φA and φD conduction periods 60a and 60d, respectively, relatively much larger than those created during phase overlap conduction intervals 62 between other the conduction periods, φD & φC, φC & φB, and φB & φA, is a result of the higher flux values induced in the stator 24 because of the "short flux path" generated during the φA & φD phase-overlap conduction interval 62 shown in FIG. 4.

Figure 3:
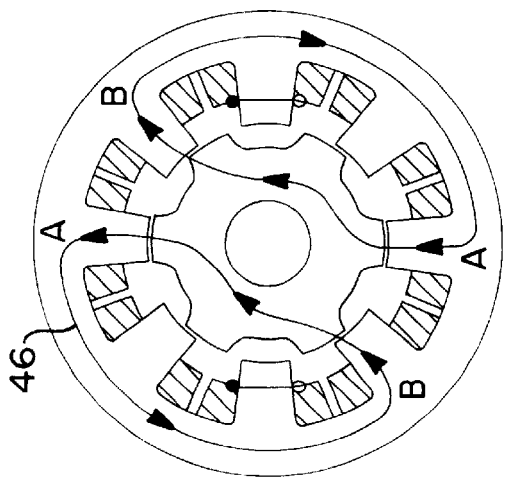
FIG. 3 is a cross-sectional view of a switched reluctance motor showing the long flux path between the A and B phase windings (i.e., the path of the magnetic flux field occurring as a result of interaction between the A phase winding and the B phase winding).
Figure 4:
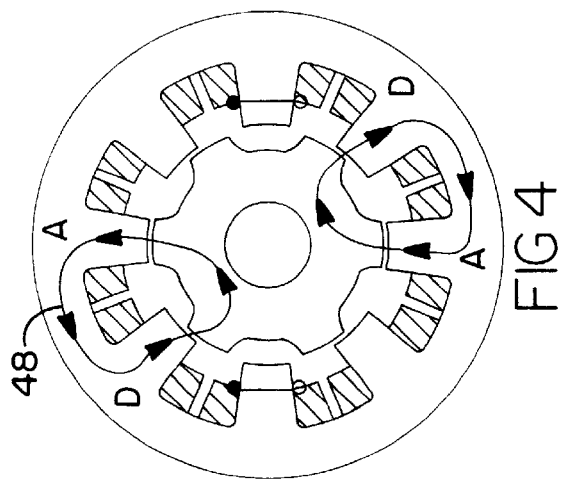
FIG. 4 is a cross-sectional view of a switched reluctance motor showing the short flux path between the A and D phase windings (i.e., the path of the magnetic flux field occurring as a result of interaction between the A phase winding and the D phase winding).

FIGS. 3 and 4 show the "flux paths" created in the stator 24 during phase overlap as a result of the torque spikes 64. A line integral of the magnetic field around the closed "flux path" yields the absolute magnetomotive force (mmf) being generated. Longer flux paths yield larger mmf drops around the closed path, which corresponds to a lower flux field value and a correspondingly lower torque output. FIG. 3 shows the long flux path 46 between the φA phase 30a and the φB phase 30b windings that results from the interaction between their magnetic fields during their phase overlap operation. Similar long flux paths also occur between the φB phase 30a and φC phase 30c windings and between the φC phase 30c and φD phase 30d windings during each of their respective periods of phase overlap operation.

In contrast, FIG. 4 shows the short flux path 48 that occurs between the φA phase 30a and the φD phase 30d windings during their phase overlap operation. The strong field strength represented by the short flux path 48 is a result of the constructive interference between the individual magnetic fields of the φA phase 30a and the φD phase 30d windings and corresponds to higher torque output from the rotor 28.

Figure 7:
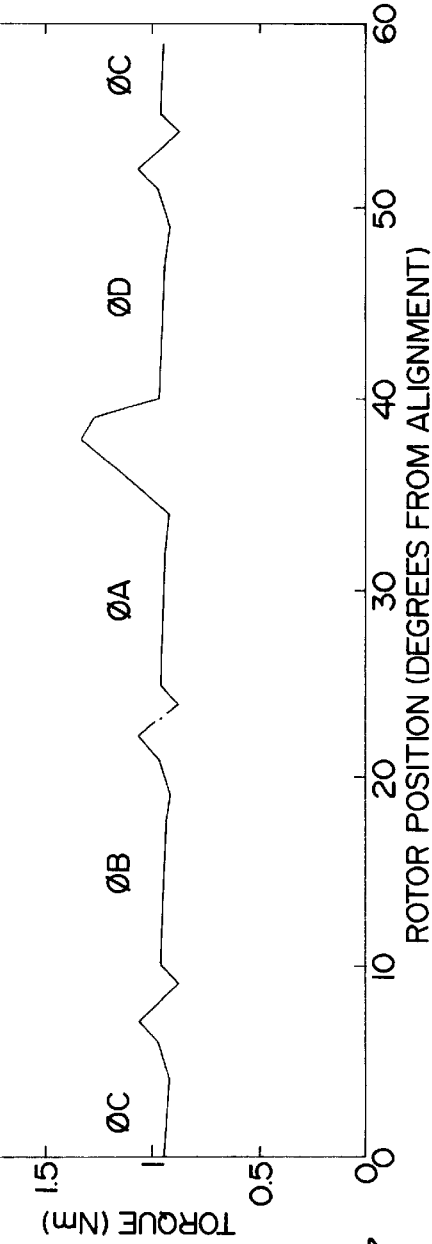
FIG. 7 is a graphical representation of a motor's output torque as a function of its rotor position for a motor with phase overlap that compensates for flux variation using the present invention.

FIG. 7 is a graphical representation of the output torque of a SRM 20 as a function of the position of its rotor 28 for an SRM 20 that operates with phase-overlap conduction interval 62, but which compensates for torque spikes 64 in accordance with the present invention. A comparison of FIG. 7 with FIG. 6 reveals that the present invention reduces the torque ripple effect for both long flux path 46 and short flux path 48 magnetic fields.

Figure 8:
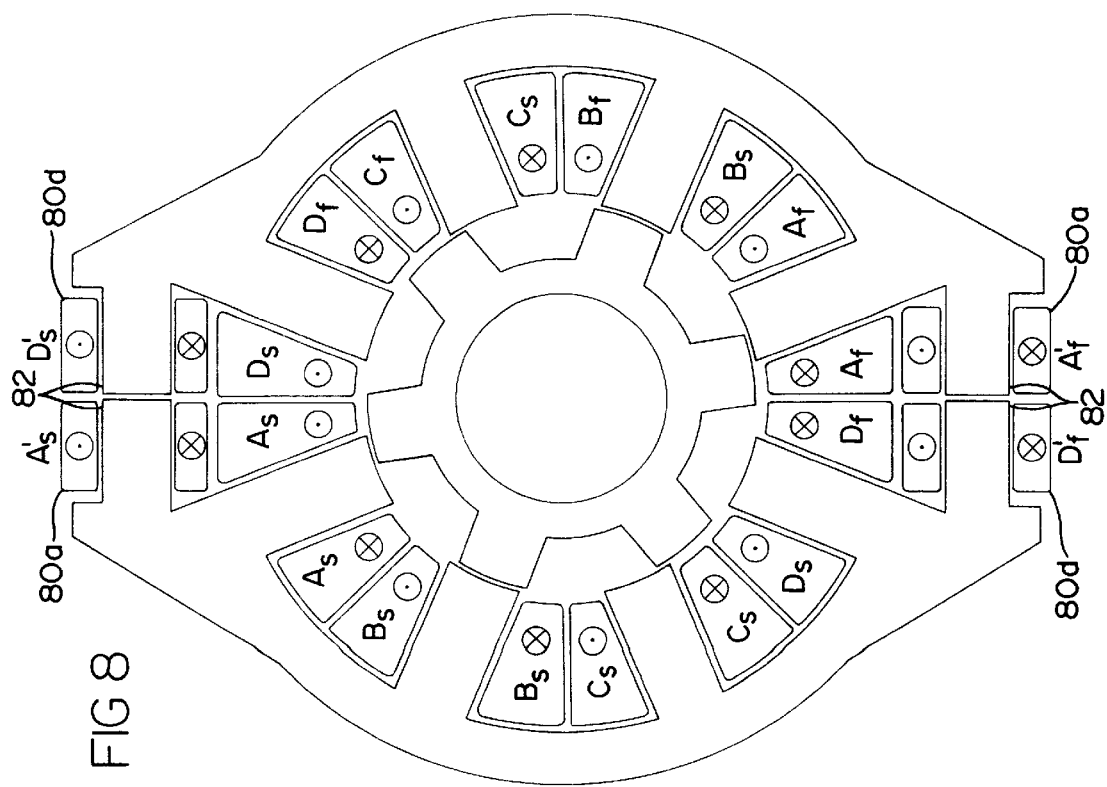
FIG. 8 is a cross sectional view of a switched reluctance motor showing the placement and field orientation of the flux compensating c oils relative to that of the phase coil windings

In FIG. 8, implementation of the present invention is illustrated. Special compensating phase coils 80a and 80d that have twenty percent of the ampere-turns of main phase coils 30a and 30d are wound in series with the φA and φD phases 30a and 30d on bobbin structures 82 on the stator 24. Although compensating coils 80 with twenty percent of the ampere-turns of the main phase coils 30 are used in the illustrated implementation, the number of ampere-turns is a variable that may be range from 10 percent to 40 percent depending on the geometry of the particular stator 24 and rotor 28 used. When the compensating coils 80a and 80d are energized during the phase overlap conduction intervals 62a through 62d, they induce a mutually coupled magnetic flux field that opposes the increased magneto motive force (mmf) of the magnetic field generated by the two main phase 30 windings during the phase overlap conduction interval 62a through 62d.

The flux compensating coils 80a and 80d are oriented physically such that the magnetic flux field that each one generates opposes, at least in part, the magnetic flux field generated by each couple of main phase windings 30a through 30d during each sequential phase overlap conduction period 62a through 60d shown in FIG. 6. To minimize the strength of the short flux path 48 and its large associated torque spike 64d, however, flux compensating coils 80a and 80d are positioned such that a significant component of the magnetic flux field that each one generates when energized during the φA/φD phase overlap conduction interval 62d is parallel and opposite to the magnetic flux field generated by the φA phase 30a and the φD phase 30d windings.

Figure 11:
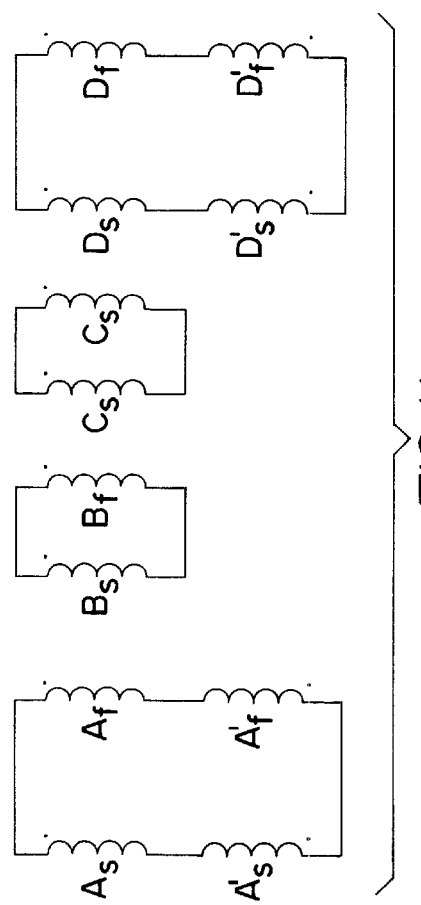
FIG. 11 is a schematic representation of compensating coils connected in a series/parallel combination with main phase windings of a SRM.
Figure 9:
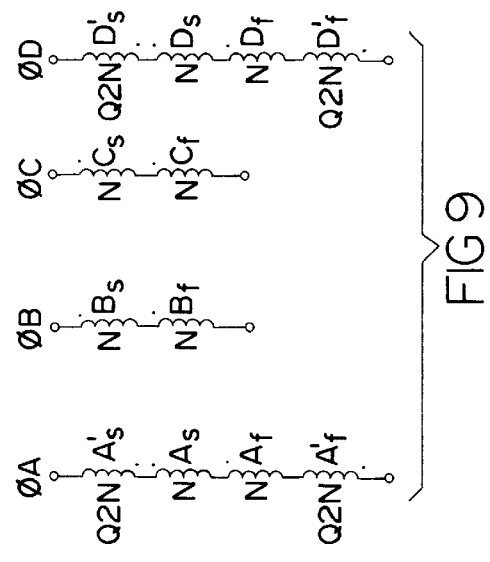
FIG. 9 is a schematic representation of compensation coils connected in series with main phase windings of a SRM.
Figure 10:
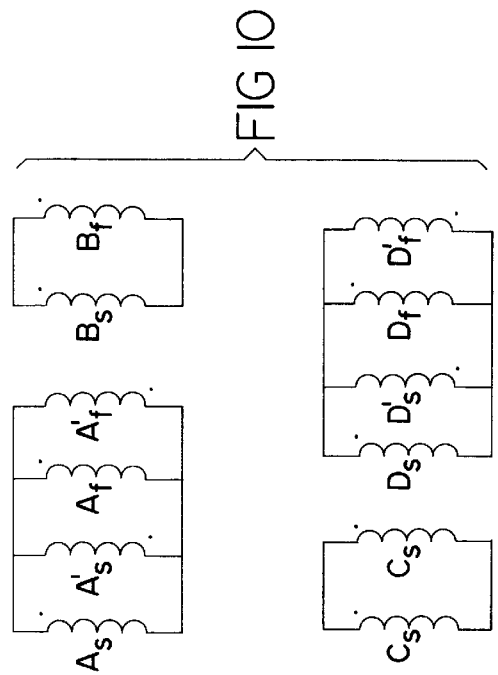
FIG. 10 is a schematic representation of compensation coils connected in parallel with main phase windings of a SRM.

FIGS. 9, 10 and 11 show examples of the present invention implemented in series, parallel, and series-parallel inductive circuits. FIG. 9 shows the four main phase windings 30a through 30d as four inductive elements φA through φD, respectively, each inductive element having a start winding φA$_S$ through φD$_S$ connected in series with a finish winding φA$_F$ through φD$_F$ where N represents the number of turns of each coil. Compensating coils 80a and 80d, each have series connected start and finish windings φA'$_S$, and φA'$_F$ and φD'$_S$ and φD'$_F$, respectively, that are connected in series with the polarity indicated by the dots in FIG. 9 with their corresponding φA and φD phase windings and have at least twenty percent of the number of winding turns (0.2N) of the corresponding main phase winding 30a or 30d.

In similar fashion, a parallel implementation of the present invention shown in FIG. 10 shows each of the four main phase windings 30a through 30d as four inductive elements φA through φD, respectively, each inductive element having a start winding φA$_S$ through φD$_S$ connected in parallel with the polarity indicated by the dots in FIG. 10 with a finish winding φA$_F$ through φD$_F$. Compensating coils 80a and 80d, φA'$_S$ and φA'$_F$, and φD'$_S$ and φD'$_F$, respectively, are connected in parallel with the corresponding φA and φD phase winding 30a and 30d, respectively. Finally, a combination series-parallel implementation of the present invention shown in FIG. 11 shows each of the four main phase windings 30a through 30d as four inductive elements φA through φD, respectively, each element having a start winding φA$_S$ through φD$_S$ connected in parallel with the polarity indicated by the dots with a finish winding φA$_F$ through φA$_F$. The start windings φA'$_S$ and φD'$_S$ of the compensating coils 80a and 80d are connected in series with start windings of the main phase coils φA$_S$ and φD$_S$ respectively. Likewise, the finish windings φA'$_F$ and φD'$_F$ are connected in series with the finish windings φA$_F$ and φD$_F$ of the main phase windings φA and φD, respectively.

Although the present inventive method for minimizing the torque ripple effect in a SRM by using strategically mounted compensating coils to compensate for the variation in output torque that occurs during phase-overlap conduction intervals has been illustrated in the context of a four phase SRM, the invention may be applied to SRMS with any number of phases, including two, three, and five phase SRMs, and be implemented using a variety of inductive circuit combinations. Other alternative and minor variations of the illustrated implementation apparent to those skilled in the art may still properly fall within the scope of the claims, which follow.

I claim:

1. A method for minimizing the output torque ripple effect of a switched reluctance electric motor having at least two main winding, comprising the steps of:
   providing a compensating coil positioned adjacent to at least one of said two main windings such that when energized the flux created by current flowing through said compensation coil opposes the flux created in said adjacent main winding;
   intermittently energizing said two main windings simultaneously; and
   energizing said compensating coil simultaneously with said adjacent main winding.

2. The method of claim 1, further comprising the step of:

mounting said compensation coil on the stator of said switched reluctance motor.

3. The method of claim 1, further comprising the step of:

winding said compensating coil in series with at least one of said two main windings.

4. The method of claim 1, further comprising the step of:

winding said compensating coil in parallel with at least one of said two main windings.

5. A method for minimizing the output torque ripple effect of a switched reluctance electric motor having at least two main windings, comprising the steps of:

providing a compensating coil mounted on the stator of said switched reluctance motor adjacent to at least one of said two main windings such that when energized the flux created by current flowing through said compensation coil opposes the flux created in said adjacent main winding; and intermittently energizing said two main windings simultaneously with said compensating coil.

6. The method of claim 5, further comprising the step of:

winding said compensating coil in series with at least one of said two main windings.

7. The method of claim 5, further comprising the step of:

winding said compensating coil in parallel with at least one of said two main windings.

8. An apparatus for minimizing the output torque ripple effect of a switched reluctance electric motor during operation in which at least two of said motor's multiple main windings are intermittently energized simultaneously, comprising:

at least one compensating coil positioned relative to at least one of said two energized main windings such that when said compensating coil is energized the flux created by current flowing through said compensation coil opposes the flux created in said adjacent main winding.

9. The apparatus of claim 8, wherein:

said compensation coil is mounted on the stator of said switched reluctance motor.

10. The apparatus of claim 8, wherein:

said compensation coil is wound in series with each one of said two main coils.

11. The apparatus of claim 8, wherein:

said compensation coil is wound in parallel with at least one of said main coils.

12. An apparatus for minimizing the output torque ripple effect of a switched reluctance electric motor during operation in which at least two of said motor's multiple main windings are intermittently energized simultaneously, comprising:

at least one compensating coil mounted on the stator said switched reluctance motor and positioned relative to at least one of said two energized main windings such that when said compensating coil is energized the flux created by current flowing through said compensation coil opposes the flux created in said adjacent main winding.

13. The apparatus of claim 12 wherein said compensation coil is wound in series with each one of said two main coils.

14. The apparatus of claim 12 wherein said compensation coil is wound in parallel with at least one of said main coils.

* * * * *